United States Patent [19]

Sliger

[11] 4,206,873
[45] Jun. 10, 1980

[54] METHOD OF MAKING A THERMOSTAT CONSTRUCTION WITH AN ANNULAR SEALING MEMBER

[75] Inventor: Boyd P. Sliger, Concord, Tenn.

[73] Assignee: Robertshaw Controls Company, Richmond, Va.

[21] Appl. No.: 941,543

[22] Filed: Sep. 12, 1978

[51] Int. Cl.² .......................................... G05D 23/12
[52] U.S. Cl. .................................... 236/34.5; 277/9; 277/205
[58] Field of Search ...................... 277/205, 1, 206, 9; 285/DIG. 11; 236/34.5; 220/295; 138/30

[56] References Cited

U.S. PATENT DOCUMENTS

| | | | |
|---|---|---|---|
| 1,980,448 | 11/1934 | Stoddard | 277/205 X |
| 2,777,715 | 1/1957 | Beyer | 277/206 X |
| 2,826,441 | 3/1958 | Niessen | 277/205 X |
| 3,015,510 | 1/1962 | Bates | 277/205 X |
| 3,284,145 | 11/1966 | Bixby | 277/205 X |
| 3,537,711 | 11/1970 | Walker | 277/206 R X |
| 3,588,129 | 6/1971 | Pitner | 277/205 X |
| 3,637,223 | 1/1972 | Weber | 277/205 |
| 3,664,691 | 5/1972 | Nakamura | 285/DIG. 11 X |
| 3,779,564 | 12/1973 | Chookazian | 277/205 X |

FOREIGN PATENT DOCUMENTS 2460746 1/1976 Fed. Rep. of Germany ...... 277/206 R

*Primary Examiner*—Albert J. Makay
*Assistant Examiner*—William E. Tapolcai, Jr.
*Attorney, Agent, or Firm*—Candor, Candor & Tassone

[57] ABSTRACT

A thermostat construction having an annular flange secured between an engine block and a water outlet housing with the flange having an annular sealing member that is provided with a generally U-shaped cross-sectional configuration disposed about the peripheral end of the flange and with the peripheral end received in the bight of the U-shape to seal the flange to the block and to the housing. The annular sealing member initially has its bight facing at an angle to its assembled bight in order to facilitate the making of such annular sealing member and/or to facilitate the assembly of the annular sealing member to the thermostat flange.

20 Claims, 6 Drawing Figures

METHOD OF MAKING A THERMOSTAT CONSTRUCTION WITH AN ANNULAR SEALING MEMBER

BACKGROUND OF THE INVENTION

1. Field of the Invention

This invention relates to a method of making an improved combination of a thermostat construction and an annular sealing member for the annular flange of the thermostat construction.

2. Prior Art Statement

It is known to applicant to provide an annular sealing member with a generally U-shaped cross-sectional configuration disposed about the peripheral end of an annular flange of a thermostat construction with the peripheral end being received in the bright of the U-shape in order to seal that flange between an engine block and a water outlet housing of a water cooled internal combustion engine.

Such prior known annular sealing member is formed with its bight being disposed in the same direction as the bight thereof in its assembled condition with the annular flange of the thermostat construction, such direction being substantially transverse to the longitudinal axis of the annular sealing member.

For example, see FIG. 2 of the drawings of this application which illustrates such prior known annular sealing member in its unassembled condition.

SUMMARY OF THE INVENTION

It is a feature of this invention to provide an improved annular sealing member for the annular flange of a thermostat construction that is adapted to have that annular flange secured between an engine block and a water outlet housing of a water cooled internal combustion engine so that the annular sealing member can seal the flange to the block and to the housing.

Conventionally, sealing of the thermostat in a water cooled internal combustion engine has been accomplished by using a paper, cellulose, cork or other similar cut gasket placed either between the thermostat flange and the engine block or between the thermostat flange and the water outlet housing. This cut gasket has an inside diameter smaller than the thermostat flange and generally is the shape of the outlet housing flange so that the water path is blocked past the flange to the radiator and to the outside. This arrangement has worked well in the past since most outlet housings has been cast (either sand or die) with a subsequent machining operation on the sand cast parts. However, as a cost savings measure, engine designers are now utilizing sheet metal outlet housings and with such parts, it has been found there is difficulty in holding flatness to the degree that is necessary and since the sheet metal is not nearly as rigid as cast parts, warpage occurs when the bolts are being tightened whereby coolant leakage results.

A prior known attempt to overcome the above sealing difficulty has been to provide a sort of flexible grommet which completely covers the sealing area of the flange to prevent leakage between the engine block and the thermostat flange and the water outlet housing and the thermostat flange. Thus, with these paths blocked, there should be no leakage to the outside and consequently no reason for the aforementioned conventional cut gasket.

However, it is believed according to the teachings of this invention that such prior known resilient grommet requires a complicated mold to form such an annular sealing member due to the necessity for the groove being formed in its center for receiving the thermostat flange therein to be facing radially inwardly toward the longitudinal axis of the annular sealing member. For example, after each part is molded, the core for the center portion of the mold has to be pulled past the overhang or lip of the annular sealing member and it is believed that this operation adds to the cost of molding due to the difficulty of molding and the possible damage to the freshly molded rubber part. In addition, it is believed that when such annular sealing member is installed on the thermostat flange prior to use of the thermostat construction, the thermostat flange must be forced over the restricting lip of the annular sealing member in a reverse operation of the mold separation whereby the assembly operation is relatively difficult and may also result in damage to the annular sealing member.

However, it was found according to the teachings of this invention that if an annular sealing member is molded in such a manner that the bight of the general U-shape thereof is initially disposed at an angle relative to the thermostat assembled direction of such bight, a simple two-piece mold can be provided which can be separated in a direction parallel to the center line or longitudinal axis of the annular sealing member with no restrictions to the mold separation so that a much higher production rate will result with substantially no danger of damage to the annular sealing members as a result of the mold separation. In addition, the annular sealing member of this invention can be stretched over the outside diameter of the annular flange of the thermostat construction without danger of damage as a result of the installation and the resulting assembled shape of the annular sealing member of this invention will be with a flat condition on the annular flange so as to have the same appearance and excellent sealing ability of the prior known annular sealing member.

In particular, one embodiment of this invention provides a method of making a combination of a thermostat construction having an annular flange secured between an engine block and a water outlet housing, the flange having an annular sealing member with a generally U-shaped cross-sectional configuration disposed about the peripheral end of the flange and with the peripheral end being received in the bight of the U-shape to seal the flange to the block and to the housing. The annular sealing member is formed to initially have its bight facing at an angle to such bight in its assembled condition with the thermostat flange and is assembled to the peripheral end of the flange by a turning of the bight from its initial facing direction to face and receive the peripheral end of the flange therein.

For example, the bight can be initially transverse to the assembled condition of such bight as will be apparent hereinafter whereby such angle can be substantially a right angle.

Accordingly, it is an object of this invention to provide an improved method of making a combination of a thermostat construction and annular sealing member for the mounting flange thereof, the method of this invention having one or more of the novel features of this invention as set forth above or hereinafter shown or described.

3

Other objects, uses and advantages of this invention are apparent from a reading of this description which proceeds with reference to the accompanying drawings forming a part thereof and wherein:

DESCRIPTION OF THE PREFERRED EMBODIMENT

Figure 1:
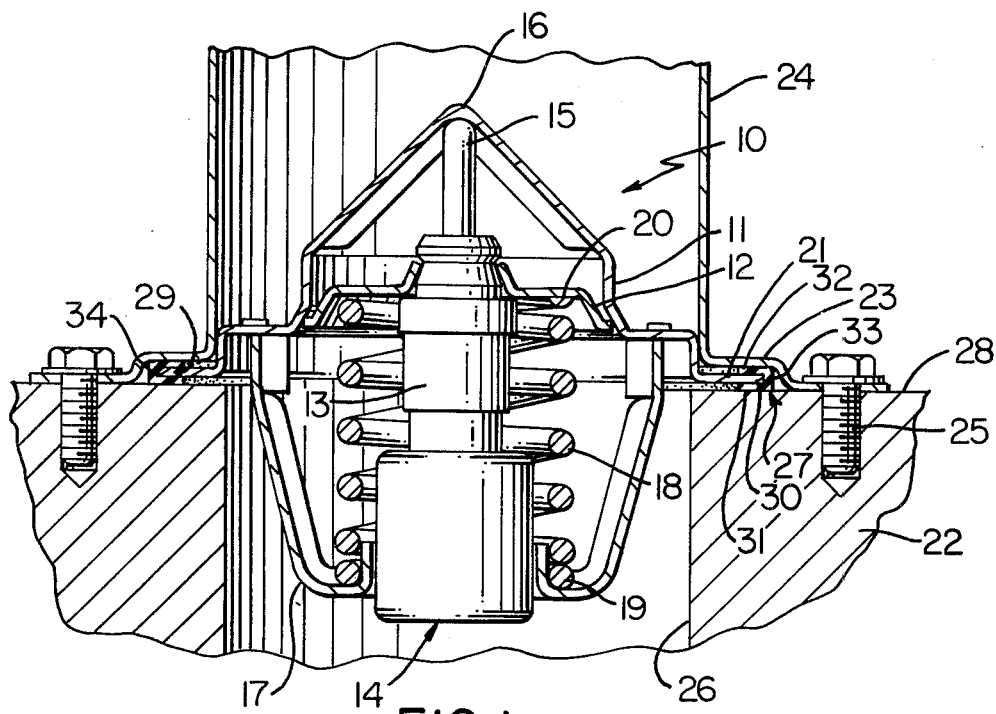
FIG. 1 is a fragmentary cross-sectional view illustrating the improved annular sealing member of this invention in combination with a thermostat construction that is assembled between an engine block and a water outlet housing of a water cooled internal combustion engine.

While the various features of this invention are hereinafter described and illustrated as being particularly adapted to provide an annular sealing member for a thermostat construction for a water cooled internal combustion engine, it is to be understood that the various features of this invention can be utilized singly or in any combination thereof to provide an annular sealing member for other devices as desired.

Therefore, this invention is not to be limited to only the embodiments illustrated in the drawings, because the drawings are merely utilized to illustrate one of the wide variety of uses of this invention.

Referring now to FIG. 1, a thermostat construction of this invention is generally indicated by the reference numeral 10 and comprises a conventional valve seat member 11 adapted to be opened and closed by a valve member 12 carried by the cylinder 13 of a piston and cylinder temperature responsive device that is generally indicated by the reference numeral 14 and has the piston 15 thereof bearing against an apex portion 16 of the valve seat structure 11 in a manner well known in the art.

A spring retainer 17 is secured to the valve seat structure 11 in such a manner that a compression spring 18 can have one end 19 bearing against the spring retainer 17 and the other end 20 bearing against the valve member 12 to tend to move the valve member 12 toward its closed condition against the valve seat 11.

The valve seat structure 11 has an outwardly directed annular peripheral mounting flange 21 adapted to be disposed between an engine block 22 and a mounting flange 23 of a water outlet housing 24 that is secured to the engine block 22 by a plurality of threaded fastening means 25 in a manner well known in the art.

In this manner, the temperature responsive piston and cylinder device 14 is adapted to sense the temperature of the fluid in the opening 26 of the engine block 22 so that if the temperature of the fluid exceeds a certain temperature, the charge of wax or the like disposed in the cylinder 13 expands and thereby causes the cylinder 13 to move downwardly in FIG. 1 in opposition to the force of the compression spring 18 to open the valve member 12 away from the valve seat 11 so that the fluid from the engine 22 can pass into the outlet housing 24 and flow to the engine radiator to be cooled before being returned to the engine 22 to perform its cooling function therefor. Conversely, should the temperature of the coolant fluid for the engine 22 fall below a certain temperature, the wax charge in the cylinder 13 contracts and thereby permits the compression spring 18 to move the valve member 12 against the valve seat 11 to prevent the flow of the coolant from the engine passage 26 to the outlet housing 24 in a manner well known in the art.

As previously stated, it was found desirable to provide suitable sealing between the mounting flange 21 of the thermostat construction 10 and the engine block 22 and water outlet housing 24 so as to prevent leakage of coolant past the flange 21 to the outlet housing 24 or the exterior of the block 22 and housing 24 for obvious reasons.

Accordingly, an improved annular sealing member of this invention that is generally indicated by the reference numeral 27 in the drawings is utilized to seal the peripheral flange 21 of the thermostat construction 10 to the upper surface 28 of the engine block 22 and to the mounting flange 23 of the water outlet housing 24.

In particular, it can be seen in FIG. 1 that the annular sealing member 27 of this invention is formed from rubber, plastic or any other suitable material and has a substantially U-shaped cross-sectional configuration so that the resulting bight 29 of the U-shape will receive the peripheral end 30 of the mounting flange 21 of the thermostat construction 10 therein. In this manner, a pair of legs 31 and 32 of the annular sealing member 27 will be disposed on opposite sides of the flange 21 to respectively seal against the engine block 22 and mounting flange 23 of the water outlet housing 24 while a bridging portion 33 of the annular sealing member 27 completely encases the end edge 34 of the flange 21 as illustrated, the resiliency of the annular sealing member 27 compensating for any warpage of the flange 23 of the outlet housing 24 and/or irregularities in the surface 28 of the engine block 22.

Figure 2:
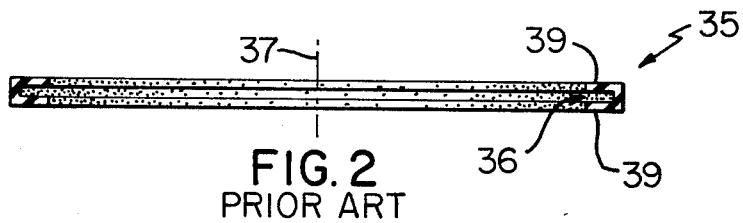
FIG. 2 is an enlarged cross-sectional view of a prior known annular sealing member.

As previously stated, the annular sealing member 27 of this invention when in the assembled condition illustrated in FIG. 1 performs substantially the same function in substantially the same manner as an annular sealing member of the prior art that is generally indicated by the reference numeral 35 in FIG. 2 and comprises rubber, plastic or other suitable material formed in the U-shape illustrated in FIG. 2 wherein the bight 36 thereof faces radially inwardly toward the longitudinal axis 37 thereof and the pair of legs 39 thereof are disposed in spaced parallel relation to each other and are similarly directed toward the longitudinal axis 37. In this manner, the prior art annular sealing member 35 can be stretched over the annular flange 21 of the thermostat construction 10 so as to receive the peripheral end 30 of the flange 21 into the bight 36 thereof and have the legs 38 and 39 disposed on opposite sides of the flange 21 to perform the sealing function illustrated in FIG. 1 wherein the annular sealing member 27 of this invention is utilized to provide the sealing function previously described.

However, as previously stated, in order to mold the prior art annular sealing member 35, not only must the center or core mold member be removed from the bight 36, but also the annular sealing member 35 must be stretched over the annular flange 21 so in order to receive the annular flange 21 into the bight 36 thereof.

Figure 3:
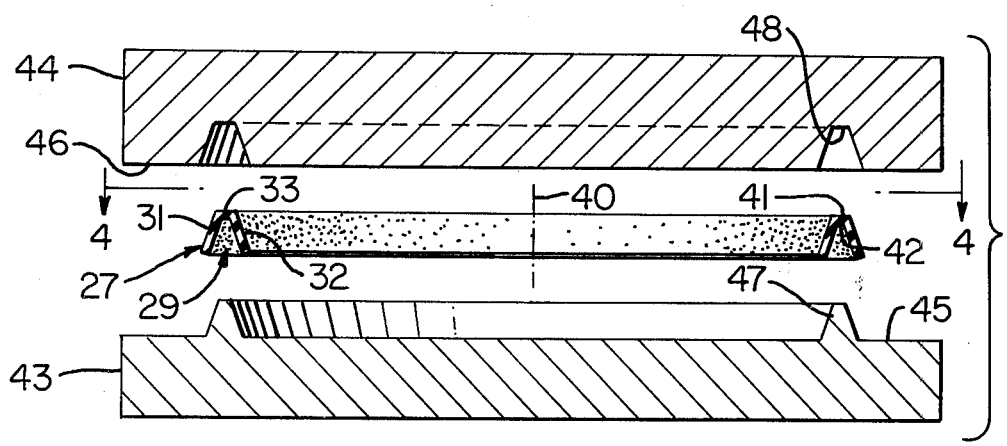
FIG. 3 is a cross-sectional view illustrating the improved annular sealing member of this invention and the apparatus of this invention for making such annular sealing member according to the method of this invention.
Figure 4:
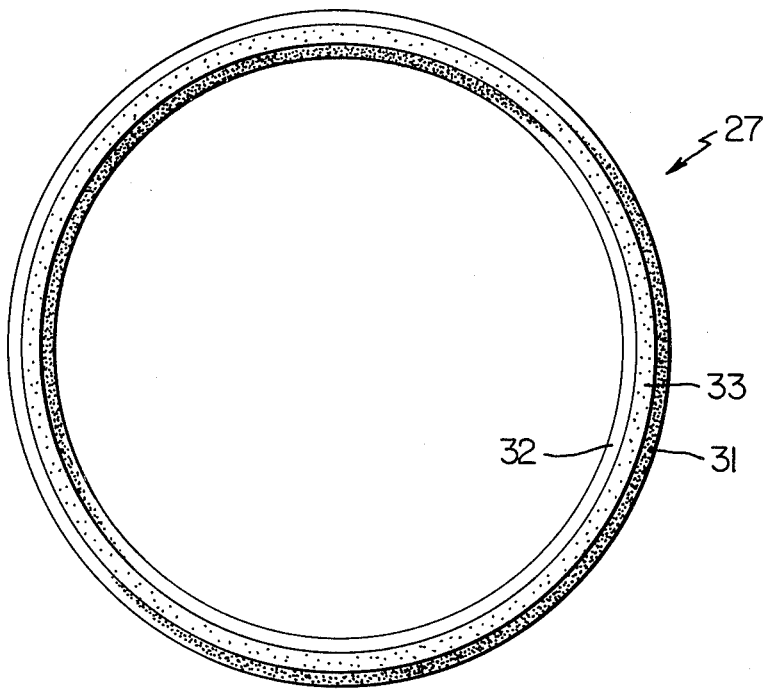
FIG. 4 is a top view of the annular sealing member of FIG. 3 and is taken in the direction of the arrows 4—4 of FIG. 3.

In contrast, the annular sealing member 27 of this invention, when in its unassembled condition, is in the configuration illustrated in FIG. 3 wherein the bight 29 thereof faces at an angle to the assembled bight 29 thereof of FIG. 1 and in the embodiment of the annular sealing member 27 of this invention, such angle is substantially at a right angle or transverse to the assembled bight 29 of FIG. 1.

Figure 5:
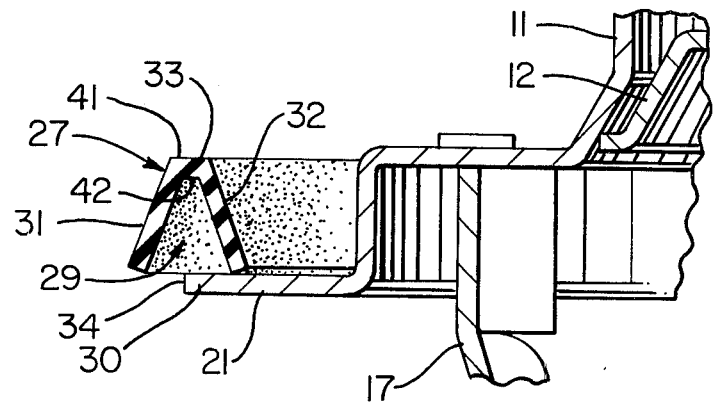
FIG. 5 is an enlarged, fragmentary cross-sectional view illustrating one step in the method of this invention for assembling the annular sealing member of this invention to the annular mounting flange of the thermostat construction of FIG. 1.

In particular, the annular sealing member 27 of this invention has the bight 29 thereof facing in the same direction as the longitudinal axis 40 of the annular sealing member 27 and is initially substantially V-shaped because the legs 31 and 32 normally diverge away from each other as they extend away from an apex 41 of the triangular bight 29, the inside of the apex 41 being defined by an annular flat section 42 as best illustrated in FIG. 5.

In this manner, it can be seen that the annular sealing member 27 of this invention can be molded in a relatively simple manner by utilizing the simple mold members 43 and 44 illustrated in FIG. 3 which have cooperating surfaces 45 and 46 that can be brought toward each other to mold the annular sealing member 27 therebetween from any suitable material.

In particular, the mold member 43 has an annular V-shaped projection 47 extending from the surface 45 thereof that is adapted to be received in an annular V-shaped groove 48 formed in the surface 46 of the mold member 44 and cooperate therewith to mold the annular member 27 therebetween whereby the mold members 43 and 44 can be moved away from each other along the axis 40 of the molded annular sealing member 27 to permit the annular sealing member 27 to be readily removed therefrom without requiring stretching of the annular sealing member 27 to remove the same from the mold members 43 and 44 as is required with the prior known annular sealing member 35.

The diameter of such annular apex 41 of the unassembled annular sealing member 27 of this invention is made slightly smaller than the diameter of the peripheral edge 34 of the desired thermostat flange 21 to which the annular sealing member 27 is to be assembled in a manner hereinafter described.

In addition, the width of the annular apex section 41 of the annular sealing member 27 is also molded with a dimension slightly smaller than the thickness of the flange 21 to which it is to be assembled in a manner now to be described.

Figure 6:
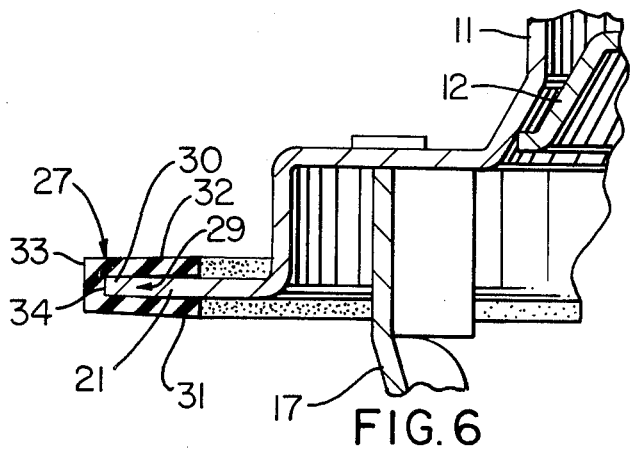
FIG. 6 is a view similar to FIG. 5 and illustrates the annular sealing member of this invention in its assembled condition to the annular mounting flange of the thermostat construction.

As illustrated in FIG. 5, the annular sealing member 27 is disposed against the annular flange 21 of the thermostat construction 10 and is merely stretched over the same through a slight rotation of the annular sealing member 27 so as to bring the peripheral end 30 of the flange 21 within the bight 29 thereof in the manner illustrated in FIG. 6 and because of the unique configuration of the annular sealing member 27, the same when receiving the peripheral end 30 of the flange 21 into the bight 29 thereof causes the legs 31 and 32 of the annular sealing member 27 to lie substantially flat against the opposed sides of the flange 21 as illustrated in FIG. 6 so that the annular sealing member 27 remains assembled to the annular flange 21 in the condition illustrated in FIG. 6 once the same has been assembled thereto in the simple manner previously described.

Thus, after the annular sealing member 27 of this invention has been assembled to the peripheral flange 21 of the thermostat construction 10 through only the slight stretching thereof, the thermostat construction 10 can be set on the surface 28 of the engine block 22 of FIG. 1 and, thereafter, the mounting flange 23 of the water outlet housing 24 can be disposed against annular sealing member 27 and be secured to the engine block 22 by the fastening means 25 whereby the annular sealing member 27 of this invention will perform the sealing function between the block 22 and housing 24 in the manner and for the reasons previously set forth.

Therefore, it can be seen that the annular sealing member 27 of this invention has all of the advantages of the prior known annular sealing member 35 and none of the disadvantages thereof as the annular sealing member 27 of this invention can be simply molded by the mold member 43 and 44 in the manner previously described and be readily assembled to the thermostat construction 10 in a simple manner as previously described without requiring undue stretching of the annular sealing member 27 nor complicated molding structure therefor.

While the annular sealing member 27 of this invention can be formed of any suitable material and be of any suitable thickness and dimensions, one typical example of an annular sealing member 27 of this invention for a thermostat construction that has a peripheral flange 21 of a diameter of approximately 2.085 of an inch and a thickness of approximately 0.028 of an inch, comprises a molded precision rubber compound, No. 40335 sold by Precision Rubber Products Corporation of Lebanon, Tenn., with the legs 31 and 32 being approximately 0.125 of an inch long, the inner annular apex section 41 being approximately 0.020 of an inch wide and the legs 31 and 32 being approximately 0.020 of an inch thick.

From the above, it can be seen that this invention not only provides an improved combination of a thermostat construction and an annular sealing member therefor and method of making the same, but also this invention provides an improved annular sealing member and method of making the same.

While the methods of this invention, now preferred, have been illustrated and described as required by the Patent Statute, it is to be understood that other method steps can be utilized and still fall within the scope of the appended claims.

What is claimed is:

1. In a method of making the combination of a thermostat construction having an annular flange secured between an engine block and a water outlet housing, said flange having an annular sealing member with a generally U-shaped cross-sectional configuration disposed about the peripheral end of said flange and with said peripheral end being received in the bight of said U-shape to seal said flange to said block and to said housing, the improvement comprising the steps of forming said annular sealing member to initially have its said bight facing at an angle to its said bight in its assembled condition with said flange, and assembling said annular sealing member to said peripheral end of said flange by turning said bight from its initial facing direction to face and receive said peripheral end of said flange therein.

2. A method as set forth in claim 1 and including the step of forming said angle to be substantially a right angle.

3. A method as set forth in claim 1 and including the step of forming said assembled annular sealing member to be in a stretched condition on said flange.

4. A method as set forth in claim 1 and including the step of forming said annular sealing member to initially have its said bight defined by a generally V-shaped cross-sectional configuration before being in its assembled condition with said flange.

5. A method as set forth in claim 4 and including the step of forming said initial V-shape to have an apex thereof defined by a substantially flat annular section of said sealing member.

6. A method as set forth in claim 4 and including the step of forming said initial V-shape to have a pair of diverging annular legs that become substantially parallel with each other when said annular sealing member is in its assembled condition with said flange.

7. A method as set forth in claim 6 wherein said step of turning said bight of said annular sealing member comprises the step of rotating said annular sealing member from its initial condition to its assembled condition.

8. A method as set forth in claim 7 wherein said step of forming said annular sealing member comprises the step of forming said pair of annular legs to be initially disposed substantially concentric to each other so that one of said legs is initially disposed inboard of the other of said legs, said step of turning said bight of said annular sealing member comprises the steps of disposing said one leg transversely against one side of said peripheral end of said flange, and thereafter, rotating said annular sealing member so that said other leg is brought against the other side of said peripheral end of said flange in substantially parallel relation therewith while said peripheral end of said flange is received in said bight that is now turned to face said peripheral end of said flange in substantially a coplanar manner therewith and said one leg is turned into substantially parallel relation to said one side of said peripheral end of said flange.

9. A method as set forth in claim 1 wherein said step of turning said bight of said annular sealing member comprises the step of rotating said annular sealing member from its initial condition to its assembled condition.

10. A method as set forth in claim 1 wherein said step of forming said annular sealing member comprises the step of forming said bight to be defined by a pair of annular legs that are initially disposed substantially concentric to each other so that one of said legs is initially disposed inboard of the other of said legs, said step of turning said bight of said annular sealing member comprises the steps of disposing said one leg transversely against one side of said peripheral end of said flange, and thereafter, rotating said annular sealing member so that said other leg is brought against the other side of said peripheral end of said flange while said peripheral end of said flange is received in said bight that is now turned to face said peripheral end of said flange in substantially a coplanar manner therewith.

11. In the method of making the combination of a thermostat construction having an annular flange adapted to be secured between an engine block and a water outlet housing and an annular sealing member with a generally U-shaped cross-sectional configuration disposed about the peripheral end of said flange and with said peripheral end being received in the bight of said U-shape so as to be adapted to seal said flange to said block and to said housing, the improvement comprising the steps of forming said annular sealing member to initially have its said bight facing at an angle to its said bight in its assembled condition with said flange, and assembling said annular sealing member to said peripheral end of said flange by turning said bight from its initial facing direction to face and receive said peripheral end of said flange therein.

12. A method as set forth in claim 11 and including the step of forming said angle to be substantially a right angle.

13. A method as set forth in claim 11 and including the step of forming said assembled annular sealing member to be in a stretched condition on said flange.

14. A method as set forth in claim 11 and including the step of forming said annular sealing member to initially have its said bight defined by a generally V-shaped cross-sectional configuration before being in its assembled condition with said flange.

15. A method as set forth in claim 14 and including the step of forming said initial V-shape to have an apex thereof defined by a substantially flat annular section of said sealing member.

16. A method as set forth in claim 14 and including the step of forming said initial V-shape to have a pair of diverging annular legs that become substantially parallel with each other when said annular sealing member is in its assembled condition with said flange.

17. A method as set forth in claim 16 wherein said step of turning said bight of said annular sealing member comprises the step of rotating said annular sealing member from its initial condition to its assembled condition.

18. A method as set forth in claim 17 wherein said step of forming said annular sealing member comprises the step of forming said pair of annular legs to be initially disposed substantially concentric to each other so that one of said legs is initially disposed inboard of the other of said legs, said step of turning said bight of said annular sealing member comprises the steps of disposing said one leg transversely against one side of said peripheral end of said flange, and, thereafter, rotating said annular sealing member so that said other leg is brought against the other side of said peripheral end of said flange in substantially parallel relation therewith while said peripheral end of said flange is received in said bight that is now turned to face said peripheral end of said flange in substantially a coplanar manner therewith and said one leg is turned into substantially parallel relation to said one side of said peripheral end of said flange.

19. A method as set forth in claim 11 wherein said step of turning said bight of said annular sealing member comprises the step of rotating said annular sealing member from its initial condition to its assembled condition.

20. As method as set forth in claim 11 wherein said step of forming said annular sealing member comprises the step of forming said bight to be defined by a pair of annular legs that are initially disposed substantially concentric to each other so that one of said legs is initially disposed inboard of the other of said legs, said step of turning said bight of said annular sealing member comprises the steps of disposing said one leg transversely against one side of said peripheral end of said flange, and, thereafter, rotating said annular sealing member so that said other leg is brought against the other side of said peripheral end of said flange while said peripheral end of said flange is received in said bight that is now turned to face said peripheral end of said flange in substantially a coplanar manner therewith.

* * * * *